United States Patent [19]

Carlson et al.

[11] 4,028,269

[45] June 7, 1977

[54] PROCESS FOR THE PREPARATION OF A SOLID BED CATALYST SYSTEM

[75] Inventors: David H. J. Carlson, Park Ridge; Thomas A. Verachtert, Wheeling; Jay E. Sobel, Highland Park, all of Ill.

[73] Assignee: UOP Inc., Des Plaines, Ill.

[22] Filed: Aug. 21, 1975

[21] Appl. No.: 606,635

[52] U.S. Cl. .............................. 252/428; 252/431 N
[51] Int. Cl.² ..................... B01J 31/12; B01J 31/02
[58] Field of Search ......................... 252/431 N, 428

[56] References Cited
UNITED STATES PATENTS

| | | | |
|---|---|---|---|
| 3,148,156 | 9/1964 | Henry | 252/420 |
| 3,230,180 | 1/1966 | Larson | 252/431 |

Primary Examiner—Winston A. Douglas
Assistant Examiner—Mark Bell
Attorney, Agent, or Firm—James R. Hoatson, Jr.; Kimbley L. Muller; William H. Page, II

[57] ABSTRACT

A process is disclosed for the preparation of a solid bed catalyst system which comprises treating a charcoal-containing solid support with steam and a substantially inert gas at a temperature of from about 800° F. to about 950° F. for a period of time comprising from about 2 hours to about 6 hours, drying the treated bed and impregnating the dried charcoal-containing solid support with from about 0.001 weight percent to about 10.00 weight percent of a metal phthalocyanine compound.

11 Claims, No Drawings

PROCESS FOR THE PREPARATION OF A SOLID BED CATALYST SYSTEM

This invention relates to a process for the preparation of a solid bed catalyst system. More specifically, this invention resides in a process for the preparation of a solid bed catalyst which comprises treating a charcoal-containing solid support with steam and a substantially inert gas at a temperature of about 800° F. to about 950° F. for a period of time comprising about 2 hours to about 6 hours, drying the treated charcoal-containing solid support in a substantially inert atmosphere and impregnating the dried charcoal-containing solid support with from 0.001 weight percent to about 10.00 weight percent with a metal phthalocyanine compound.

Various methods of solid bed treating of petroleum distillates are well known in the art. One such method comprises the treatment of a petroleum distillate for the conversion of mercaptan compounds to disulfide compounds by air oxidation in the presence of a fixed bed catalyst comprising a metal phthalocyanine compound dispersed on a carbon or charcoal support. Other treating procedures consist of the treatment of an aqueous stream or an aqueous-alkali stream for the conversion of hydrogen sulfide to elemental sulfur by means of polysulfide decomposition in the presence of air and a metal phthalocyanine compound dispersed on a solid charcoal support. It is these types of known treating procedures which the preparation of the solid bed catalyst is directed. Various methods have been found for the preparation of the solid bed catalyst systems. One such known method is exemplified in U.S. Pat. No. 3,230,180. This patent covers a method of preparation of a metal phthalocyanine compound on a charcoal carrier by heating phthalonitrile at a temperature of from about 175° C. to about 325° C. in contact with an oxide of a metal component of the desired phthalocyanine compound. It is contemplated within the scope of this invention that such a method of preparation or any other method of preparation known to the art may be used in step (c) of the method of preparation of the present invention, however, the impregnation step may only be accomplished subsequent to the treatment of the charcoal-containing solid support with steam and drying the steam treated charcoal-containing solid support with a substantially inert gas such as nitrogen. The recovered metal phthalocyanine impregnated charcoal-containing solid support of the present invention may be utilized in refining processes such as the treatment of sulfur-containing compounds. These processes will include the treatment of a petroleum distillate charge stock with air in the presence of the composition of matter prepared within the scope of this invention for the conversion of mercaptan compounds to disulfide compounds for ecological reasons or the conversion of hydrogen sulfide to elemental sulfur by the intermediate of polysulfide decomposition, said hydrogen sulfide being treated with air in the presence of the novel catalyst treatment process of the present invention. The recovered solid bed catalyst system of the present invention may also be used in such chemical process reactions as hydroformylation, hydrogenation, dehydrogenation, dehydrocyclization, reforming, transalkylation, isomerization, isomax, etc.

It is an object of this invention to prepare a solid bed catalyst system for utilization in refinery procedures.

A further object of this invention is to prepare a solid bed catalyst system utilizing the pretreatment of steam and impregnation of a metal phthalocyanine compound.

In one aspect an embodiment of this invention resides in a process for the preparation of a solid bed catalyst system which comprises treating a charcoal-containing solid support with an atmosphere comprising steam and a substantially inert gas at a temperature of from about 800° F. to about 950° F. for a period of time comprising from about 2 hours to about 6 hours, drying the treated charcoal-containing solid support in an atmosphere comprising a substantially inert gas at drying conditions, impregnating the dry charcoal-containing solid support at impregnation conditions with from about 0.001 weight percent to about 10.00 weight percent of a metal phthalocyanine compound and recovering the resultant metal phthalocyanine impregnated charcoal-containing solid support.

A specific embodiment of the present invention resides in the preparation of a solid bed catalyst system comprising cobalt phthalocyanine monosulfonate impregnated upon a DARCO charcoal, a charcoal derived from lignite coal, by a means of steam treating said charcoal in a substantially inert gas atmosphere comprising nitrogen at a temperature of 800° F. to about 850° F. for a period of time comprising 3 hours, drying the steam treated charcoal-containing solid support with a nitrogen purge at a temperature of 850° F. to ambient temperature and impregnating the dried charcoal-containing solid support with 150 milligrams of cobalt phthalocyanine monosulfonate per 100 cubic centimeters of DARCO charcoal.

Other objects and embodiments of the above set forth invention will be found in the following further detailed description of the present invention concerning the preparation of a solid bed catalyst system.

As hereinbefore set forth the present invention is concerned with a process for the preparation of a solid bed catalyst system by means of treating a charcoal-containing solid support with steam and a substantially inert gas. The treating conditions will include a temperature of from about 800° F. to about 950° F. for a period of time comprising from about 2 hours to about 6 hours for the total treatment of the bed with the steam and a substantially inert gas. The treatment may also be effected without the presence of the substantially inert gas. The inert gas will function not only as a diluent for the steam treatment, but also as a carrier agent to remove any residual moisture from the steam treated charcoal bed. The effect of treating the support without the inert gas would be to require a gravitational removal of residual water, thereby incurring a much greater time lapse for stream treatment and a possible wasteful expense of excess energy. Other gases such as air may also be used to treat the charcoal support, although not necessarily with equivalent results. The charcoal-containing solid support which has been steam treated is subsequently dried at drying conditions which include a temperature of from about 850° F. to about ambient temperature and a pressure of from about 1 atmosphere to about 100 atmospheres under a blanket of substantially inert gas. Suitable examples of substantially inert gases which may be used in the steam treatment and/or drying of the charcoal-containing solid support will include such gases as nitrogen, helium, argon, neon, krypton, xenon, or mixtures thereof such as nitrogen-helium, nitrogen-heliumargon, argon-krypton, xenon-argon, krypton-xenon, nitrogen-krypton, etc. The impregnation conditions for the dispersal of the metal phthalocyanine compound upon the treated and dried charcoal-containing solid support will comprise a temperature of about 75° F. to about 100° F. and a pressure of from about 1 atmosphere to about 100 atmospheres. Another impregnation condition concerns the amount of metal phthalocyanine compound impregnated onto the treated and dried charcoal-containing solid support. The preferred range of metal phthalocyanine compound to the charcoal-containing solid support will comprise from about 0.001 weight percent to about 10.000 weight percent of the metal phthalocyanine compound per weight of the total catalyst system. A specific example of the impregnation quantity of the metal phthalocyanine compound will include the impregnation of 150 milligrams of cobalt phthalocyanine monosulfonate per 100 cubic centimeters of charcoal and subsequently wetted with 5 mls of 10° Be sodium hydroxide.

The charcoal-containing solid support of the present invention will comprise any charcoal-containing absorbent compound such as those charcoals produced by destructive distillation of wood, peat, lignite, nutshells, bonechar, vegetable matter or other carbonaceous matter such as Nuchar charcoals, that may be purchased from the Westvaco Company, which is a charcoal derived from vegetable sources such as ground wood pulp, DARCO (also known as hydrodarco) which may be purchased from the Atlas Chemical Company and is further exemplified in Example I of the present application, Norit, that may be purchased from the Norit Company, which is a charcoal derived from peat, Columbia carbon which is a special charcoal extradited from petroleum black and may be purchased from the Union Carbide Company, and Pittsburgh charcoal which is derived from lignite coal and may be purchased from the Calgon Company. It is understood that the charcoal-containing compound of the present invention will comprise any charcoal-containing solid support which may be utilized in the treatment of mercaptan compounds or other sulfur-containing compounds after dispersal of the metal phthalocyanine compound upon the charcoal-containing solid support.

The metal phthalocyanine compounds which are impregnated in step (c) of the present method of preparation to the steam treated and dried charcoal-containing solid support will comprise various metal phthalocyanines such as iron phthalocyanine, cobalt phthalocyanine, copper phthalocyanine, vanadium phthalocyanine, manganese phthalocyanine, magnesium phthalocyanine, zinc phthalocyanine, titanium phthalocyanine, hafnium phthalocyanine, thorium phthalocyanine, tin phthalocyanine, lead phthalocyanine, columbia phthalocyanine, bismuth phthalocyanine, tantalum phthalocyanine, antimony phthalocyanine chromium phthalocyanine, molybdenum phthalocyanine, nickel phthalocyanine, palladium phthalocyanine, platinum phthalocyanine, silver phthalocyanine, mercury phthalocyanine, rhodium phthalocyanine, iridium phthalocyanine, ruthenium phthalocyanine, osmium phthalocyanine, technetium phthalocyanine, or the phthalocyanine compounds may be sulfonated or carboxylated such as vanadium phthalocyanine tetrasulfonate, cobalt phthalocyanine monosulfonate, cobalt phthalocyanine disulfonate, cobalt phthalocyanine tetrasulfonate, copper phthalocyanine disulfonate, manganese phthalocyanine trisulfonate, magnesium phthalocyanine monosulfonate, zinc phthalocyanine tetrasulfonate, titanium phthalocyanine disulfonate, hafnium phthalocyanine carboxylate, thorium phthalocyanine dicarboxylate, tin phthalocyanine tetracarboxylate, lead phthalocyanine disulfonate, columbium phthalocyanine disulfonate, tantalum phthalocyanine tetrasulfonate, bismuth phthalocyanine disulfonate, chromium phthalocyanine carboxylate, molybdenum phthalocyanine carboxylate, molybdenum phthalocyanine tetracarboxylate, nickel phthalocyanine disulfonate, palladium phthalocyanine disulfonate, palladium phthalocyanine monosulfonate, silver phthalocyanine monosulfonate, mercury phthalocyanine tetrasulfonate, iridium phthalocyanine carboxylate, ruthenium phthalocyanine carboxylate, iridium phthalocyanine tetrasulfonate, osmium phthalocyanine trisulfonate, etc.

It is understood that the aforementioned charcoal-containing solid supports, inert gases and metal phthalocyanine compounds are only representative of the class of compounds which may be employed within the present invention and that the present invention is not necessarily limited thereto.

The solid bed metal phthalocyanine dispersed catalyst system may be utilized in the treatment of sulfur-containing compounds. More specifically, the solid bed catalyst system may be used in the superatmospheric treatment of mercaptan-containing petroleum distillates and alkali- or aqueous-alkali-containing hydrogen sulfide systems. The mercaptan-containing compounds in a petroleum distillate may be exemplified by mercaptan compounds possessing from about 1 carbon atom to mercaptan compounds possessing about 19 carbon atoms. Other mercaptan compounds which may also be present will include aromatic mercaptans such as thiophenol or substituted thiophenol or branched-chain aliphatic hard to treat mercaptans such as tertiary dodecyl mercaptans. Specific types of mercaptans which may be converted to disulfide material utilizing the solid bed catalyst system of the present invention will include methyl mercaptan, ethyl mercaptan, propyl mercaptans, butyl mercaptans, pentyl mercaptans, hexyl mercaptans, octyl mercaptans, nonyl mercaptans, decyl mercaptans, undecyl mercaptans, dodecyl mercaptans, tridecyl mercaptans, tetradecyl mercaptans, pentadecyl mercaptans, hexadecyl mercaptans, heptadecyl mercaptans, octadecyl mercaptans, nonadecyl mercaptans, various mercaptobenzothiophenols, hydroxy mercaptans such as mercaptoethanol, cysteine, aromatic mercaptans such as thiophenol, methyl-substituted thiophenol isomers, ethyl-substituted thiophenol isomers, etc. The treatment of the mercaptan or hydrogen sulfide compounds may be effected in a medium possessing a pH in the range of from about a pH of 8 to about a pH of 14 and preferably in a range of a pH of about 11 to about 14. Suitable examples of reaction medium will comprise sodium hydroxide, potassium hydroxide, lithium hydroxide, rubidium hydroxide, cesium hydroxide, barium hydroxide, strontium hydroxide, calcium hydroxide, magnesium hydroxide, beryllium hydroxide, ammonia, pyridine, piperidine, picoline, lutidine, quinoline, pyrrole, indole, carbazole, acridine, or any suitable quaternary ammonium compound such as tetrabutyl ammonium hydroxide, tetraamyl ammonium hydroxide, tetrapropyl ammonium methoxide, tetrabutyl ammonium methoxide, tetraamyl ammonium methoxide, tetraethyl ammonium methoxide, diethyl amine, triethyl amine, tetramethylene diamine, tetraethylene pentamine, phenylene diamine, etc.

The necessary weight percentage of the solid bed catalyst system necessary to treat the mercaptan or hydrogen sulfide compounds will comprise from about 0.0001 weight percent of the metal phthalocyanine supported solid bed catalyst to about 10.0000 weight percent of the metal phthalocyanine solid bed catalyst system to convert the sulfur-containing compounds to the desirable sulfur-containing disulfides or elemental sulfur.

The treatment of the sulfur-containing compounds will be conducted in any suitable manner but preferably a continuous type process is preferred. In a continuous process the treatment medium may contain the sulfur-containing compound or the treatment medium may be intermediately charged to the recovered novel charcoal impregnated phthalocyanine catalyst system. The sulfur-containing charge stock is continuously passed over the charcoal bed of the present invention in the presence of oxygen and the mercaptan compounds or hydrogen sulfide compounds are thereby converted to the desired respective disulfide compounds and elemental sulfur.

The following examples are introduced to illustrate the further novelty and utility of the present invention but not with the intention of unduly limiting the same.

EXAMPLE I

In this example a catalyst was prepared by impregnating 13.3 cc of DARCO charcoal (obtained from Atlas Chemical Division ICI America) at a rate of 150 milligrams of cobalt phthalocyanine monosulfonate per 100 cubic centimeters of charcoal. The catalyst impregnated support was wetted with 5 ml of 10° Be sodium hydroxide plus 100 ml of a sour kerosine distillate possessing the physical properties in Table I below:

TABLE I

| | | |
|---|---|---|
| HYDROGEN SULFIDE | 2 | ppm |
| MERCAPTAN SULFUR | 390 | ppm |
| COPPER | 0.021 | mg/liter |
| [1]ACID NUMBER | 0.001 | ml KOH/gram |
| [2]SAYBOLT COLOR | 30 | |
| API GR 60° F. | 42.9 | |
| SP GR 60° F. | 0.8114 | |
| DISTILLATION | | |
| IBP   ° F. | 349 | |
| 5 | 364 | |
| 10 | 368 | |
| 30 | 384 | |
| 50 | 404 | |
| 70 | 425 | |
| 90 | 456 | |
| 95 | 470 | |
| EP   ° F. | 490 | |

[1]ACID NUMBER is determined by titration with potassium hydroxide.
[2]SAYBOLT COLOR is measured after 20 hour acceleration The kerosine was shaken with the catalyst impregnated on the charcoal support in the presence of air at ambient conditions of pressure and temperature. Kerosine samples were removed periodically, filtered, and analyzed for mercaptan sulfur content, said analysis being set forth in Table II below:

TABLE II

| Shaking Time, Minutes | Wt-ppm Mercaptan Sulfur |
|---|---|
| 0 | 390 |
| 30 | 13 |
| 60 | 4 |
| 90 | 1 |
| 120 | 1 |

EXAMPLE II

In this example another sample of the DARCO charcoal utilized in Example I was treated with steam under a nitrogen blanket at a temperature of 850° F. for a period of 3 hours. The condensate from the steam was removed during treating with a continuous nitrogen purge and the treated charcoal bed was dried under a continuous purge of nitrogen at 850° F. to ambient temperature for a period of time comprising 2 hours. The treated and dried charcoal support was impregnated with cobalt phthalocyanine monosulfonate utilizing the same impregnation procedure as set forth in Example I above. The treated, dried and impregnated catalyst support was used to treat 100 ml of the sour kerosine distillate described in Example I above. The kerosine was shaken with the catalyst support in the presence of air at ambient conditions of pressure and temperature. Kerosine samples were removed periodically, filtered and analyzed for mercaptan sulfur content, said analyses being set forth in Table III below:

TABLE III

| Shaking Time, Minutes | Wt-ppm Mercaptan Sulfur |
|---|---|
| 0 | 390 |
| 10 | 15 |
| 20 | 8 |
| 30 | 4 |
| 60 | 1 |
| 90 | <1 |
| 120 | <1 |

The unexpected results of the present invention may clearly be seen in the comparison of the data received from the treatment of the same charge stock under the same physical parameters with the catalyst set forth in Example I in comparison to the steam treated, dried and impregnated support of Example II. In Table II, which represents the data received utilizing the charcoal support which was not steam treated before impregnation, the mercaptan sulfur content was 13 wt-ppm after 30 minutes of stirring. In contrast, the charcoal support utilizing the steam and a substantially inert gas treatment possessed a mercaptan sulfur content of 15 wt-ppm at 10 minutes and 8 wt-ppm at 20 minutes. The greater ease of mercaptan oxidation can be seen from the fact that the mercaptans of Table III were oxidized at a rate of close to 3 times as fast as those oxidized in Table II. Further, it can be seen that the oxidation utilizing the steam and a substantially inert gas treated charcoal of Example II resulted in a mercaptan sulfur content of 4 wt-ppm after 30 minutes. The non-steam treated charcoal support produced 13 wt-ppm mercaptan sulfur after 30 minutes of like treating. This difference is again approximately a 3-fold advantage in the system utilizing the steam and a substantially inert gas treated and metal phthalocyanine impregnated charcoal support as a catalyst in contrast to the catalyst of Example I-Table II.

We claim as our invention:

1. A process for the preparation of a solid bed catalyst system which comprises:
   a. treating a charcoal-containing solid support with an atmosphere comprising steam and a substantially inert gas at a temperature of from about 800° F. to about 950° F. for a period of time comprising from about 2 hours to about 6 hours;

b. drying the treated charcoal-containing solid support in an atmosphere comprising a substantially inert gas at drying conditions;

c. impregnating the dried charcoal-containing solid support at impregnation conditions with from about 0.001 wt. % to about 10.000 wt. % of a metal phthalocyanine compound; and d. recovering the resultant metal phthalocyanine impregnated charcoal-containing solid support.

2. The process of claim 1 further characterized in that the treating of the charcoal-containing solid support is effected at a pressure of from about 1 atmosphere to about 100 atmospheres.

3. The process of claim 1 further characterized in that the metal phthalocyanine compound is cobalt phthalocyanine monosulfonate.

4. The process of claim 1 further characterized in that the metal phthalocyanine compound is cobalt phthalocyanine tetrasulfonate.

5. The process of claim 1 further characterized in that the metal phthalocyanine compound is vanadium phthalocyanine disulfonate.

6. The process of claim 1 further characterized in that the drying conditions include a temperature of from about 850° F. to about ambient temperature and a pressure of from about 1 atmosphere to 100 atmospheres.

7. The process of claim 1 further characterized in that the impregnation conditions include a temperature of about 75° F. to about 100° F. and a pressure of about 1 atmosphere to about 100 atmospheres.

8. The process of claim 1 further characterized in that the charcoal-containing solid support comprises bone char charcoal.

9. The process of claim 1 further characterized in that the charcoal-containing solid support comprises a charcoal material derived from a vegetable by-product.

10. The process of claim 1 further characterized in that the charcoal material is derived from lignite coal.

11. The process of claim 1 further characterized in that the charcoal-containing solid support is derived from peat.

* * * * *